US010917938B2

(12) United States Patent
Kwon et al.

(10) Patent No.: US 10,917,938 B2
(45) Date of Patent: Feb. 9, 2021

(54) USER EQUIPMENT (UE), EVOLVED NODE-B (ENB) AND METHODS FOR DYNAMIC HYBRID AUTOMATIC REPEAT REQUEST (HARQ)

(71) Applicant: Apple Inc., Cupertino, CA (US)

(72) Inventors: Hwan-Joon Kwon, Portland, OR (US); Gang Xiong, Beaverton, OR (US); Hong He, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/322,068

(22) PCT Filed: Aug. 30, 2017

(86) PCT No.: PCT/US2017/049313
§ 371 (c)(1),
(2) Date: Jan. 30, 2019

(87) PCT Pub. No.: WO2018/071104
PCT Pub. Date: Apr. 19, 2018

(65) Prior Publication Data
US 2019/0191487 A1  Jun. 20, 2019

Related U.S. Application Data

(60) Provisional application No. 62/406,206, filed on Oct. 10, 2016.

(51) Int. Cl.
*H04W 4/00* (2018.01)
*H04W 88/06* (2009.01)
(Continued)

(52) U.S. Cl.
CPC ............... *H04W 88/06* (2013.01); *H04L 1/00* (2013.01); *H04L 1/1819* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

| 2012/0002657 A1 | 1/2012 | Seyama et al. |
| 2013/0163573 A1* | 6/2013 | Oizumi ................ H04L 5/0007 370/336 |

(Continued)

FOREIGN PATENT DOCUMENTS

| EP | 2913951 A1 * | 9/2015 | ........... H04L 1/1671 |
| EP | 2913951 A1 | 9/2015 | |

(Continued)

OTHER PUBLICATIONS

"International Application Serial No. PCT/US2017/049313, International Search Report dated Dec. 1, 2017", 3 pgs.

(Continued)

*Primary Examiner* — Siren Wei
(74) *Attorney, Agent, or Firm* — Kowert, Hood, Munyon, Rankin & Goetzel, P.C.

(57) ABSTRACT

Embodiments of a User Equipment (UE), Evolved Node-B (eNB) and methods for communication are generally described herein. The UE may receive downlink control information (DCI) that schedules a transport block (TB) that includes multiple code blocks. The UE may determine a transport block size (TBS) based on the DCI. The UE may attempt to decode the code blocks. The UE may, if the TBS is greater than a predetermined threshold: bundle the code blocks into code block groups for hybrid automatic repeat request (HARQ) acknowledgement; and transmit a HARQ bit per code block group. The UE may, if the TBS is less than or equal to the threshold, transmit a HARQ bit that indicates whether a decode failure has occurred for at least one of the code blocks of the TB.

20 Claims, 12 Drawing Sheets

(51) Int. Cl.
*H04L 1/18* (2006.01)
*H04L 1/00* (2006.01)
*H04W 76/27* (2018.01)
*H04W 72/04* (2009.01)
*H04W 80/02* (2009.01)
*H04L 5/00* (2006.01)

(52) U.S. Cl.
CPC ......... *H04L 1/1864* (2013.01); *H04W 72/042* (2013.01); *H04W 76/27* (2018.02); *H04W 80/02* (2013.01); *H04L 5/0055* (2013.01)

(56) References Cited

U.S. PATENT DOCUMENTS

| | | | |
|---|---|---|---|
| 2013/0301586 A1 | 11/2013 | Fan et al. | |
| 2017/0366305 A1* | 12/2017 | Hwang | H04L 5/001 |
| 2018/0034592 A1* | 2/2018 | Cao | H04L 1/0073 |
| 2018/0041311 A1* | 2/2018 | Werner | H04L 1/1858 |

FOREIGN PATENT DOCUMENTS

| | | |
|---|---|---|
| WO | WO-2010005712 A1 | 1/2010 |
| WO | WO-2016003229 A1 | 1/2016 |

OTHER PUBLICATIONS

"International Application Serial No. PCT/US2017/049313, Written Opinion dated Dec. 1, 2017", 9 pgs.

"International Application Serial No. PCT US2017 049313, International Preliminary Report on Patentability dated Apr. 25, 2019", 11 pgs.

"U.S. Appl. No. 16/408,016, Preliminary Amendment filed Jul. 25, 2019", 6 pgs.

* cited by examiner

USER EQUIPMENT (UE), EVOLVED NODE-B (ENB) AND METHODS FOR DYNAMIC HYBRID AUTOMATIC REPEAT REQUEST (HARQ)

PRIORITY CLAIM

This application is a U.S. National Stage Filing under 35 U.S.C. 371 from International Application No. PCT/US2017/049313, filed Aug. 30, 2017 and published in English as WO 2018/071104 on Apr. 19, 2018, which claims the benefit of priority to U.S. Provisional Patent Application Ser. No. 62/406,206, filed Oct. 10, 2016, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, and 3GPP LTE-A (LTE Advanced) networks. Some embodiments relate to Fifth Generation (5G) networks. Some embodiments relate to New Radio (NR) networks. Some embodiments relate to hybrid automatic repeat request (HARQ) operation.

BACKGROUND

Base stations and mobile devices operating in a cellular network may exchange data. In some cases, techniques such as hybrid automatic repeat request (HARQ) may be used to enable reliable transmission of packets. For instance, a mobile device may send one or more acknowledgement (ACK) bits to the base station to acknowledge downlink physical layer (PHY) elements transmitted by the base station. Such PHY elements may include blocks, bursts, packets and/or other. In an example scenario, the cellular network may operate in accordance with a Fifth Generation (5G) protocol and/or new radio (NR) protocol. The data rates for such protocols may be significantly higher than those used in other cellular systems, in some cases. As a result of the increased data rates, operations such as HARQ may be challenging. Accordingly, there is a general need for methods and systems for performing HARQ and other operations in this scenario and others.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
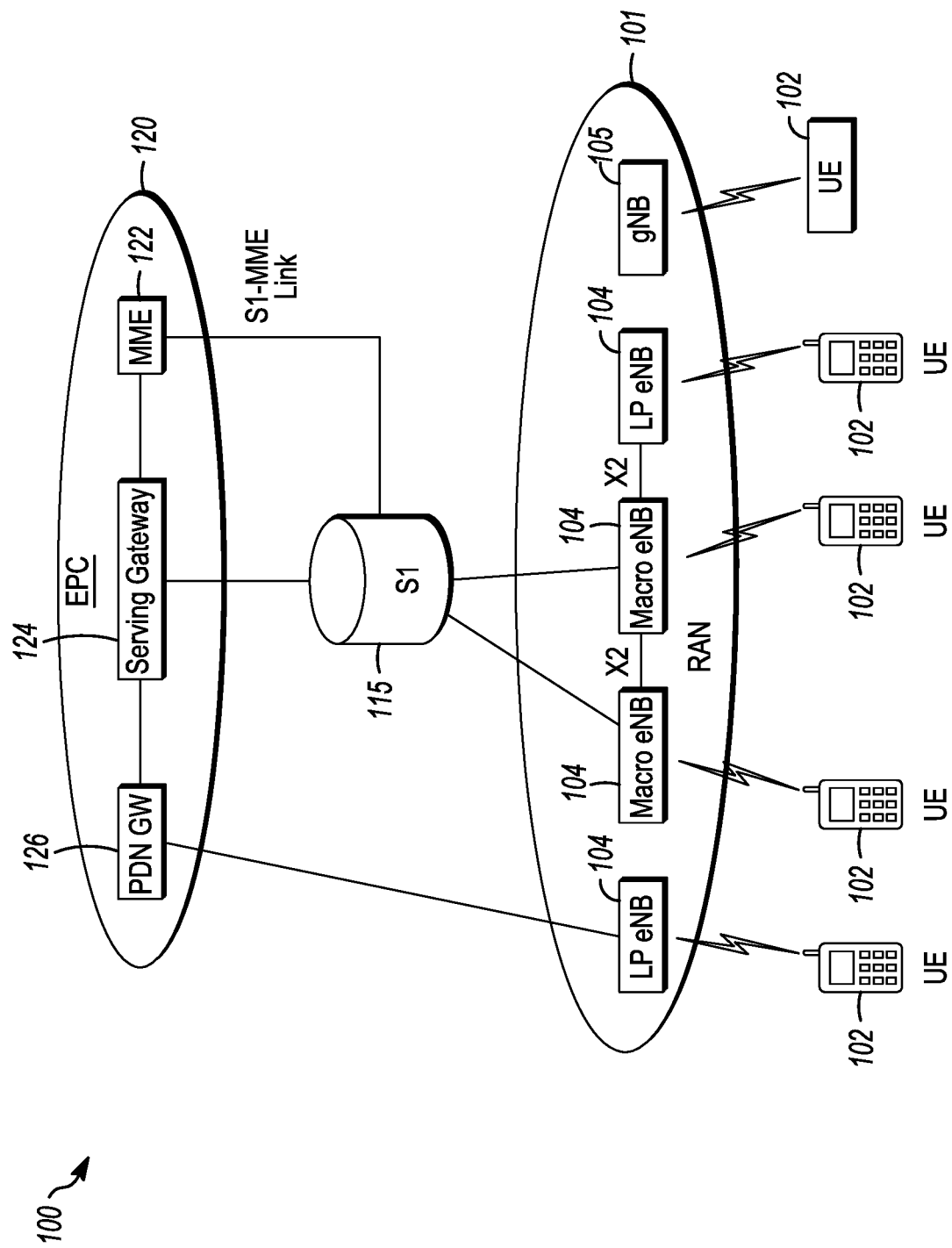
FIG. 1 is a functional diagram of an example network in accordance with some embodiments.

FIG. 1 is a functional diagram of an example network in accordance with some embodiments. In some embodiments, the network 100 may be a Third Generation Partnership Project (3GPP) network. It should be noted that embodiments are not limited to usage of 3GPP networks, however, as other networks may be used in some embodiments. As an example, a Fifth Generation (5G) network may be used in some cases. As another example, a New Radio (NR) network may be used in some cases. As another example, a wireless local area network (WLAN) may be used in some cases. Embodiments are not limited to these example networks, however, as other networks may be used in some embodiments. In some embodiments, a network may include one or more components shown in FIG. 1. Some embodiments may not necessarily include all components shown in FIG. 1, and some embodiments may include additional components not shown in FIG. 1.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In a non-limiting example, the RAN 101 may be an evolved universal terrestrial radio access network (E-UTRAN). In another non-limiting example, the RAN 101 may include one or more components of a New Radio (NR) network. In another non-limiting example, the RAN 101 may include one or more components of an E-UTRAN and one or more components of another network (including but not limited to an NR network).

The core network 120 may include a mobility management entity (MME) 122, a serving gateway (serving GW) 124, and packet data network gateway (PDN GW) 126. In some embodiments, the network 100 may include (and/or support) one or more Evolved Node-B's (eNBs) 104 (which may operate as base stations) for communicating with User Equipment (UE) 102. The eNBs 104 may include macro eNBs and low power (LP) eNBs, in some embodiments.

In some embodiments, the network 100 may include (and/or support) one or more Generation Node-B's (gNBs) 105. In some embodiments, one or more eNBs 104 may be configured to operate as gNBs 105. Embodiments are not limited to the number of eNBs 104 shown in FIG. 1 or to the number of gNBs 105 shown in FIG. 1. In some embodiments, the network 100 may not necessarily include eNBs 104. Embodiments are also not limited to the connectivity of components shown in FIG. 1.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with a New Radio (NR) protocol and/or NR standard, although the scope of embodiments is not limited in this respect. In some embodiments, the base station component may be configured to operate in accordance with a Fifth Generation (5G) protocol and/or 5G standard, although the scope of embodiments is not limited in this respect.

In some embodiments, one or more of the UEs 102 and/or eNBs 104 may be configured to operate in accordance with an NR protocol and/or NR techniques. References to a UE 102, eNB 104 and/or gNB 105 as part of descriptions herein are not limiting. For instance, descriptions of one or more operations, techniques and/or methods practiced by an eNB 104 are not limiting. In some embodiments, one or more of those operations, techniques and/or methods may be practiced by a gNB 105 and/or other base station component.

In some embodiments, the UE 102 may transmit signals (data, control and/or other) to the gNB 105, and may receive signals (data, control and/or other) from the gNB 105. In some embodiments, the UE 102 may transmit signals (data, control and/or other) to the eNB 104, and may receive signals (data, control and/or other) from the eNB 104. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

In some embodiments, the eNBs 104 (macro and micro) terminate the air interface protocol and may be the first point of contact for a UE 102. In some embodiments, an eNB 104 may fulfill various logical functions for the network 100, including but not limited to RNC (radio network controller functions) such as radio bearer management, uplink and downlink dynamic radio resource management and data packet scheduling, and mobility management.

In some embodiments, UEs 102 may be configured to communicate Orthogonal Frequency Division Multiplexing (OFDM) communication signals with an eNB 104 and/or gNB 105 over a multicarrier communication channel in accordance with an Orthogonal Frequency Division Multiple Access (OFDMA) communication technique. In some embodiments, eNBs 104 and/or gNBs 105 may be configured to communicate OFDM communication signals with a UE 102 over a multicarrier communication channel in accordance with an OFDMA communication technique. The OFDM signals may comprise a plurality of orthogonal subcarriers.

The S1 interface 115 is the interface that separates the RAN 101 and the EPC 120. It may be split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

In some embodiments, similar functionality and/or connectivity described for the eNB 104 may be used for the gNB 105, although the scope of embodiments is not limited in this respect. In a non-limiting example, the S1 interface 115 (and/or similar interface) may be split into two parts: the S1-U, which carries traffic data between the gNBs 105 and the serving GW 124, and the S1-MME, which is a signaling interface between the gNBs 104 and the MME 122. The X2 interface (and/or similar interface) may enable communication between eNBs 104, communication between gNBs 105 and/or communication between an eNB 104 and a gNB 105.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. In some embodiments, various types of gNBs 105 may be used, including but not limited to one or more of the eNB types described above.

In some embodiments, a downlink resource grid may be used for downlink transmissions from an eNB 104 to a UE 102, while uplink transmission from the UE 102 to the eNB 104 may utilize similar techniques. In some embodiments, a downlink resource grid may be used for downlink transmissions from a gNB 105 to a UE 102, while uplink transmission from the UE 102 to the gNB 105 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). There are several different physical downlink channels that are conveyed using such resource blocks. With particular relevance to this disclosure, two of these physical downlink channels are the physical downlink shared channel and the physical down link control channel.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
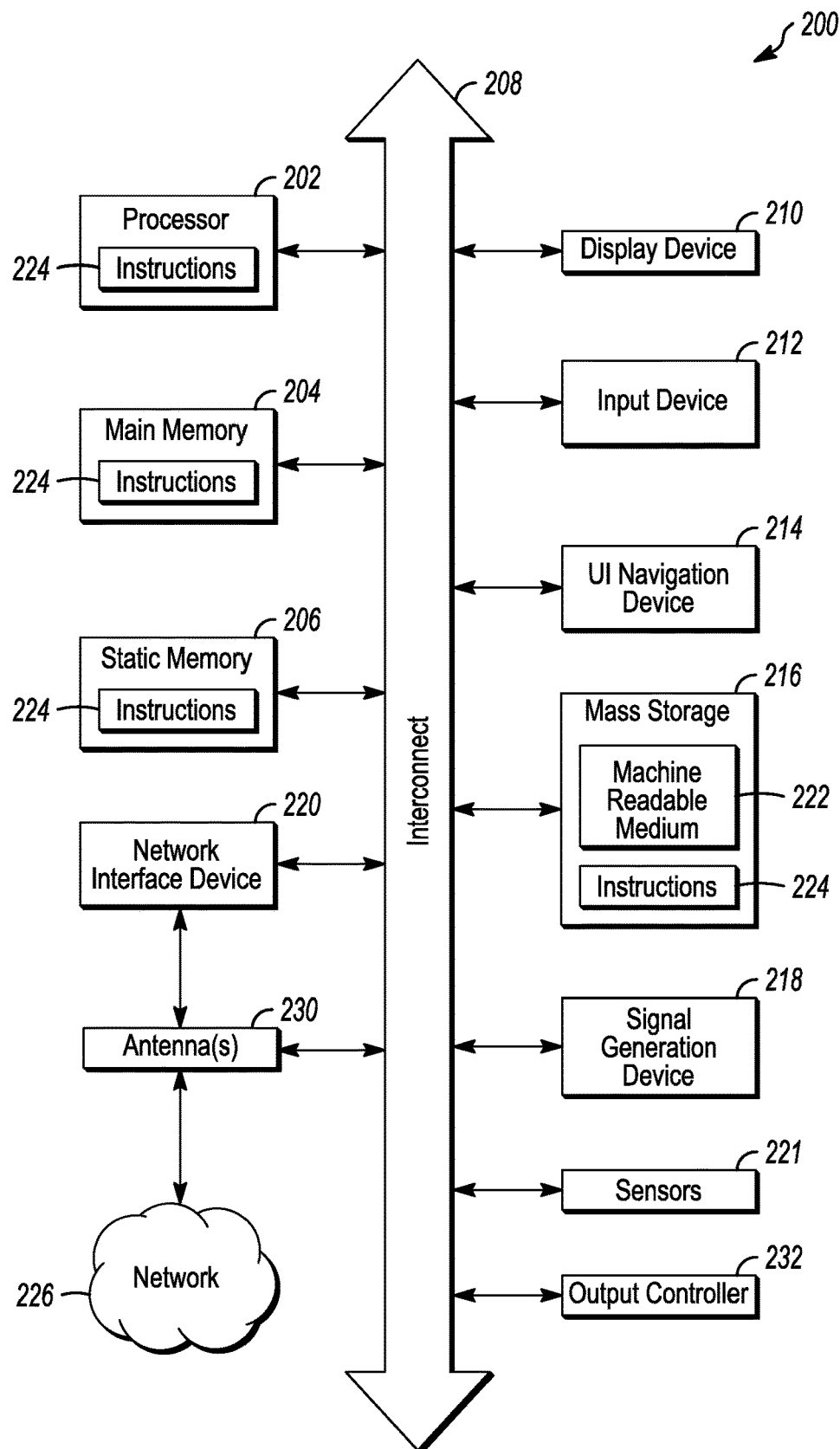
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, gNB 105, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
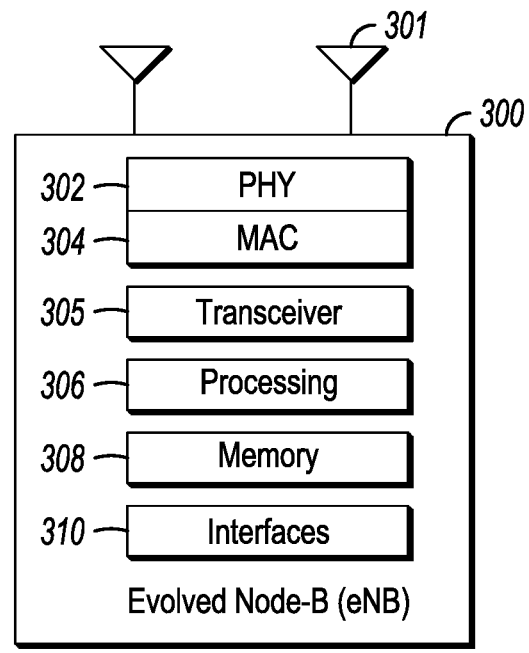
FIG. 3 illustrates a block diagram of an Evolved Node-B (eNB) in accordance with some embodiments and a block diagram of a Generation Node-B (gNB) in accordance with some embodiments.
Figure 3:
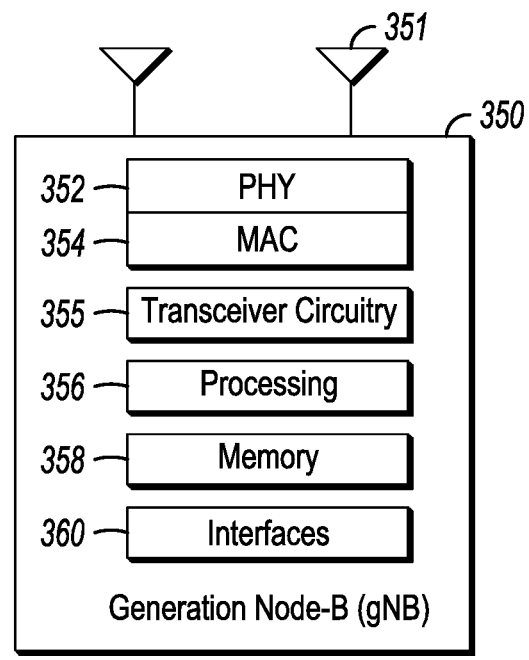

FIG. 3 illustrates a block diagram of an Evolved Node-B (eNB) in accordance with some embodiments and a block diagram of a Generation Node-B (gNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), gNBs 105, components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 (such as in 300) or both.

It should be noted that in some embodiments, the gNB 350 may be a stationary non-mobile device. The gNB 350 may be suitable for use as a gNB 105 as depicted in FIG. 1. The gNB 350 may include physical layer circuitry 352 and a transceiver 355, one or both of which may enable transmission and reception of signals to and from the UE 200, eNBs, other gNBs, other UEs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The gNB 350 may also include MAC circuitry 354 for controlling access to the wireless medium. The gNB 350 may also include processing circuitry 356 and memory 308 arranged to perform the operations described herein. The gNB 350 may also include one or more interfaces 360, which may enable communication with other components, including other gNBs 105 (FIG. 1), eNBs 104 (FIG. 1), components in the EPC 120 (FIG. 1) or other network components. In addition, the interfaces 360 may enable communication with other components that may not be shown in FIG. 1, including components external to the network. The interfaces 360 may be wired or wireless or a combination thereof. It should be noted that in some embodiments, a gNB or other base station may include some or all of the components shown in either FIG. 2 or FIG. 3 (such as in 350) or both.

Figure 4:
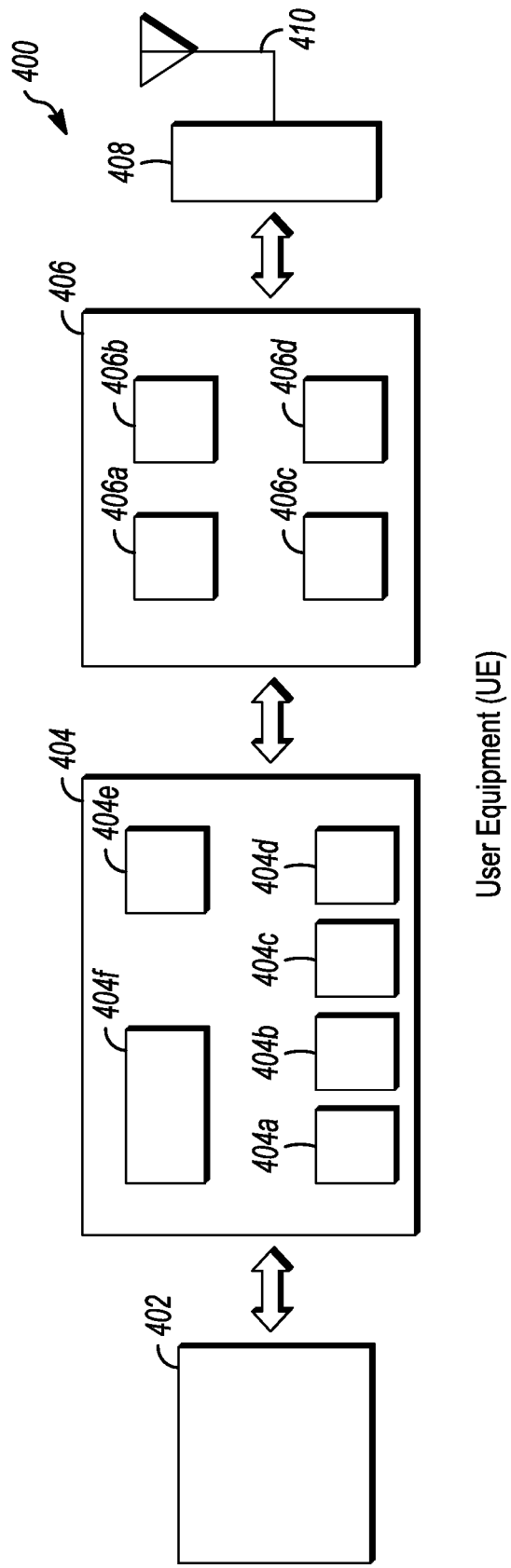
FIG. 4 illustrates a block diagram of a User Equipment (UE) in accordance with some embodiments.

FIG. 4 illustrates a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, a "transceiver" and/or "transceiver circuitry" may include one or more elements and/or components, some or all of which may be included in the RF circuitry 406 and/or the FEM circuitry 408. These examples are not limiting, however, as the processing circuitry, transceiver and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

One or more of the antennas 230, 301, 351, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, one or more of the antennas 230, 301, 351, 410 may be effectively separated to take advantage of spatial diversity and the different channel characteristics that may result.

In some embodiments, the UE 400 and/or the eNB 300 and/or gNB 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 and/or eNB 300 and/or gNB 350 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300, gNB 350 and/or other device may include one or more of a keyboard, a display, a non-volatile memory port, multiple antennas, a graphics processor, an application processor, speakers, and other mobile device elements. The display may be an LCD screen including a touch screen.

Although the UE 400, the eNB 300 and the gNB 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 400 and/or eNB 300 and/or gNB 350 and/or machine 200 may include various components of the UE 400 and/or the eNB 300 and/or the gNB 350 and/or the machine 200 as shown in FIGS. 2-4. Accordingly, techniques and operations described herein that refer to the UE 400 (or 102) may be applicable to an apparatus for a UE. In addition, techniques and operations described herein that refer to the eNB 300 (or 104) may be applicable to an apparatus for an eNB. In addition, techniques and operations described herein that refer to the gNB 350 (or 105) may be applicable to an apparatus for a gNB.

In accordance with some embodiments, the UE 102 may receive downlink control information (DCI) that schedules a downlink transmission of a transport block (TB). The TB may include multiple code blocks. The UE 102 may determine a transport block size (TBS) based on the DCI. The UE 102 may attempt to decode the code blocks. The UE 102 may, if the TBS is greater than a predetermined threshold: bundle the code blocks into code block groups for hybrid automatic repeat request (HARQ) acknowledgement and transmit a HARQ bit per code block group. The HARQ bit for a particular code block group may indicate whether a decode failure has occurred for at least one of the code blocks of the particular code block group. The UE 102 may, if the TBS is less than or equal to the threshold, transmit a HARQ bit that indicates whether a decode failure has occurred for at least one of the code blocks of the TB. These embodiments are described in more detail below.

Figure 5:
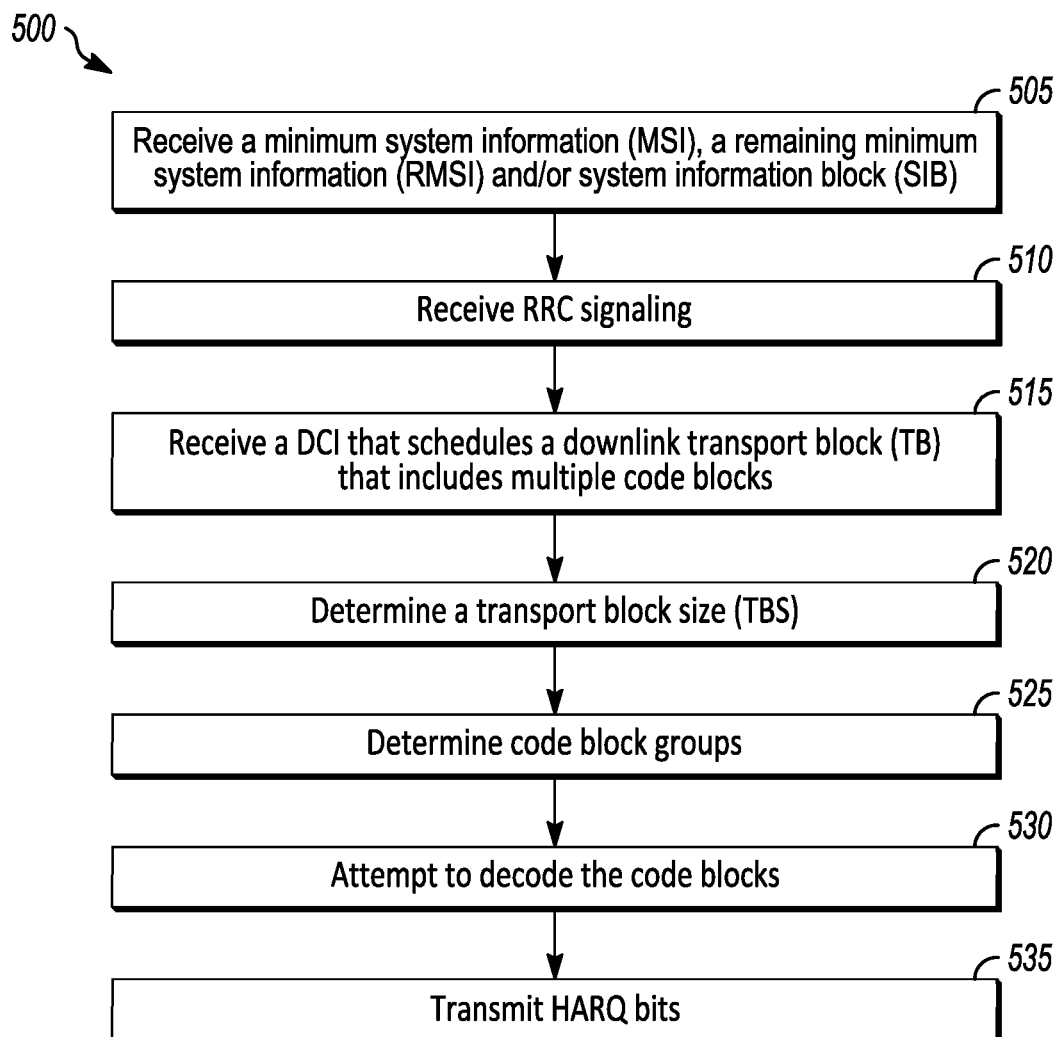
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-13, although it is understood that the method 500 may be practiced with any other suitable systems, interfaces and components.

In some embodiments, a UE 102 may perform one or more operations of the method 500, but embodiments are not limited to performance of the method 500 and/or operations of it by the UE 102. In some embodiments, the eNB 104 and/or gNB 105 may perform one or more operations of the method 500 (and/or similar operations). Accordingly, although references may be made to performance of one or more operations of the method 500 by the UE 102 in descriptions herein, it is understood that the eNB 104 and/or gNB 105 may perform the same operation(s), similar operation(s) and/or reciprocal operation(s), in some embodiments.

In addition, while the method 500 and other methods described herein may refer to eNBs 104, gNBs 105 or UEs 102 operating in accordance with 3GPP standards, 5G standards and/or other standards, embodiments of those methods are not limited to just those eNBs 104, gNBs 105 or UEs 102 and may also be practiced on other devices, such as a Wi-Fi access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 may also be applicable to an apparatus of a UE 102, an apparatus of an eNB 104, an apparatus of a gNB 105 and/or an apparatus of another device described above.

It should also be noted that embodiments are not limited by references herein (such as in descriptions of the methods 500 and 600 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 505, the UE 102 may receive one or more minimum system information (MSI), one or more remaining minimum system information (RMSI) and/or one or more system information blocks (SIBs). At operation 510, the UE 102 may receive radio resource control (RRC) signaling. The RRC signaling, MSI(s), RMSI(s) and/or SIB(s) may include various information, including but not limited to information related to HARQ, information related to code block groups, one or more thresholds, candidate bundle sizes (for bundling of code blocks) and/or other. These examples will be described in more detail below. It should be noted that embodiments are not limited to usage of RRC signaling, MSI(s), RMSI(s) and/or SIB(s) to communicate such information, as other signaling, messages, blocks and/or other elements may be used, in some embodiments. For instance, a master information block (MIB) may be used in some embodiments, including but not limited to the examples and the embodiments described herein.

In some embodiments, the RRC signaling, MSI(s), RMSI(s) and/or SIB(s) may be received from an eNB 104, although the scope of embodiments is not limited in this respect. In some embodiments, the RRC signaling, MSI(s), RMSI(s) and/or SIB(s) may be received from a gNB 105, although the scope of embodiments is not limited in this respect. In some embodiments, the RRC signaling, MSI(s), RMSI(s) and/or SIB(s) may be received from another base station component and/or other component.

It should be noted that some embodiments may not necessarily include all operations shown in FIG. 5. In some embodiments, the UE 102 may perform one of operations 505-510 but may not necessarily perform both operations 505-510. In some embodiments, the UE 102 may perform both of operations 505-510.

At operation 515, the UE 102 may receive downlink control information (DCI). At operation 520, the UE 102 may determine a transport block size (TBS). At operation 525, the UE 102 may determine code block groups.

In some embodiments, the UE 102 may receive a DCI that schedules a downlink transport block (TB). In some cases, the TB may include multiple code blocks, although the scope of embodiments is not limited in this respect. In some embodiments, the TB may be configurable to include one or more code blocks.

The DCI may include information related to the TB, including but not limited to time resources for the TB, frequency resources for the TB, a modulation and coding scheme (MCS) for the TB, a number of symbols (such as symbol periods, OFDM symbol periods and/or other), a size of the TB, a number of code blocks in the TB, a bundle size for bundling of code blocks and/or other. In some embodiments, the UE 102 may determine the TBS based at least partly on information included in the DCI.

In some embodiments, if the TBS is greater than a predetermined threshold, the UE 102 may bundle the code blocks into code block groups for hybrid automatic repeat request (HARQ) acknowledgement. In some cases, if the TBS is less than or equal to the threshold, the UE 102 may not necessarily bundle the code blocks into code block groups. For instance, a single code block group may be used in such cases.

In some embodiments, the threshold may be included in one or more MSIs, one or more RMSIs, one or more SIBs and/or RRC signaling received by the UE 102. The scope of embodiments is not limited in this respect, however, as other blocks, signaling, messages and/or other elements may be used to communicate the threshold.

In some embodiments, the UE 102 may, if the TBS is greater than the first threshold and less than or equal to a second predetermined threshold, bundle the code blocks into the code block groups based on a first bundle size. The UE 102 may, if the TBS is greater than the second threshold, bundle the code blocks into the code block groups based on a second bundle size. The first bundle size and/or second bundle size may be included in one or more MSIs, one or more RMSIs, one or more SIBs and/or RRC signaling received by the UE 102, in some embodiments. The scope of embodiments is not limited in this respect, however, as other blocks, signaling, messages and/or other elements may be used to communicate the bundle size(s).

In some embodiments, a plurality of thresholds may be used. The UE 102 may compare the TBS with a plurality of predetermined thresholds. The UE 102 may determine a number of the code block groups to be used based on a predetermined mapping between the number of the code block groups and the thresholds of the plurality. The threshold(s) may be included in one or more MSIs, one or more RMSIs, one or more SIBs and/or RRC signaling received by the UE 102, in some embodiments. The scope of embodiments is not limited in this respect, however, as other blocks, signaling, messages and/or other elements may be used to communicate the threshold(s).

In some embodiments, if the TBS is greater than the threshold, the UE 102 may bundle the code blocks into the code block groups based on a bundle size indicated in the DCI. In a non-limiting example, the bundle size may indicate a number of code blocks per code block group. In another non-limiting example, the bundle size may indicate a number of code block groups per TB. In some embodiments, candidate bundle sizes may be included in one or more MSIs, one or more RMSIs, one or more SIBs and/or RRC signaling received by the UE 102. The scope of embodiments is not limited in this respect, however, as other blocks, signaling, messages and/or other elements may be used to communicate the candidate bundle sizes. The UE 102 may select the bundle size (to be used to bundle the code blocks into code block groups) from the candidate bundle sizes based on an indicator included in the DCI. In some embodiments, the UE 102 may perform this operation if the TBS is greater than the threshold, although the scope of embodiments is not limited in this respect.

In some embodiments, the UE 102 may bundle the code blocks to include one or more contiguous code blocks per code block group. In some embodiments, the UE 102 may bundle the code blocks if the TBS is greater than the threshold, although the scope of embodiments is not limited in this respect.

In some embodiments, the UE 102 may bundle the code blocks into code block groups of uniform size in terms of number of code blocks (such as the bundle size and/or other). In some embodiments, the UE 102 may bundle the code blocks into code block groups of uniform size in terms of number of code blocks (such as the bundle size and/or other), wherein the code block groups include contiguous code blocks. In a non-limiting example, the TB may include 12 code blocks, the bundle size may be 4, and the UE 102 may bundle the code blocks into 3 code block groups of contiguous code blocks. For instance, if the code blocks are numbered 1-12, a first code block group may include code blocks numbered 1-4, a second code block group may include code blocks numbered 5-8, and a third code block group may include code blocks numbered 9-12.

In some embodiments, the UE 102 may bundle the code blocks into code block groups, wherein one or more of the code block groups are of a particular size in terms of number of code blocks (such as the bundle size and/or other). In a non-limiting example, the TB may include 11 code blocks, the bundle size may be 4, and the UE 102 may bundle the code blocks into 3 code block groups of contiguous code blocks (two code block groups with 4 code blocks and one code block group with 3 code blocks). For instance, if the code blocks are numbered 1-11, a first code block group may include code blocks numbered 1-4, a second code block group may include code blocks numbered 5-8, and a third code block group may include code blocks numbered 9-11.

These examples of bundling code blocks into code block groups are not limiting. Embodiments are not limited to usage of contiguous code blocks in the code block groups. Embodiments are also not limited to usage of a uniform size in terms of number of code blocks per code block group.

At operation 530, the UE 102 may attempt to decode the code blocks. At operation 535, the UE 102 may transmit one or more HARQ bits.

In some embodiments, if multiple code block groups are used, the UE 102 may transmit a HARQ bit per code block group. For instance, the UE 102 may transmit a HARQ bit for each code block group. In a non-limiting example, the HARQ bit for a particular code block group may indicate whether a decode failure has occurred for at least one of the code blocks of the particular code block group. In addition, in cases in which the code blocks are not bundled into multiple code block groups, the UE 102 may transmit a HARQ bit that indicates whether a decode failure has occurred for at least one of the code blocks of the TB. For instance, in some cases in which the code blocks are not bundled into multiple code block groups, a single HARQ bit may be used to indicate whether a decode failure has occurred for at least one of the code blocks of the TB.

In some embodiments, if the TBS is greater than a predetermined threshold, the UE 102 may bundle the code blocks into code block groups for the HARQ acknowledgement. The UE 102 may transmit a HARQ bit per code block group. The HARQ bit for a particular code block group may indicate whether a decode failure has occurred for at least one of the code blocks of the particular code block group. If the TBS is less than or equal to the threshold, the UE 102 may transmit a HARQ bit that indicates whether a decode failure has occurred for at least one of the code blocks of the TB.

In some embodiments, one or more HARQ bits may indicate a first chronological code block (of a sequence of code blocks) for which a decode failure occurs. In some embodiments, a DCI may schedule a downlink transmission of a TB that includes a sequence of code blocks. The UE 102 may attempt to decode the sequence of code blocks. The UE 102 may, if a decode failure occurs for at least one of the code blocks, transmit HARQ bits to indicate a first chronological code block of the sequence for which one of the decode failures has occurred. The UE 102 may, if the code blocks of the TB have been decoded successfully, transmit a particular value for the HARQ bits, wherein the particular value may be reserved to indicate that the code blocks of the TB have been decoded successfully. A number of HARQ bits to be encoded may be determined, by the UE 102, based on information included in the DCI, MSI(s), RMSI(s), SIB(s), RRC signaling and/or other. In a non-limiting example, the UE 102 may determine a number of code blocks in the TB based on the DCI. The UE 102 may also determine the number of HARQ bits to be encoded based at least partly on the number of code blocks in the TB.

In some embodiments, an apparatus of a UE 102 may comprise memory. The memory may be configurable to store the TBS. The memory may store one or more other elements and the apparatus may use them for performance of one or more operations. The apparatus may include processing circuitry, which may perform one or more operations (including but not limited to operation(s) of the method 500 and/or other methods described herein). The processing circuitry may include a baseband processor. The baseband circuitry and/or the processing circuitry may perform one or more operations described herein, including but not limited to decoding of the DCI and determination of the TBS. The apparatus of the UE 102 may include a transceiver to receive the TB. The transceiver may transmit and/or receive other blocks, messages and/or other elements.

Figure 6:
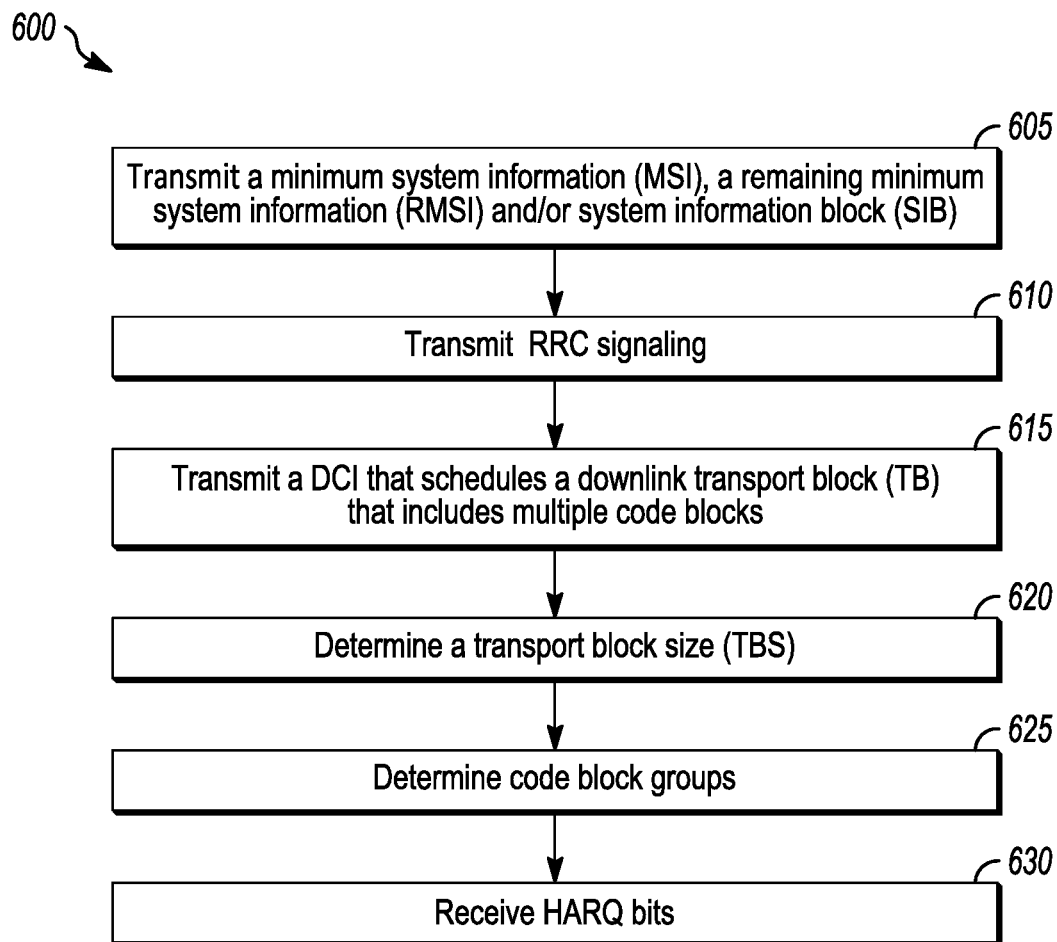
FIG. 6 illustrates the operation of another method of communication in accordance with some embodiments.

FIG. 6 illustrates the operation of another method of communication in accordance with some embodiments. As mentioned previously regarding the method 600, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-13, although it is understood that the method 600 may be practiced with any other suitable systems, interfaces and components. In addition, embodiments of the method 600 may be applicable to UEs 102, eNBs 104, gNBs 105, APs, STAs and/or other wireless or mobile devices. The method 600 may also be applicable to an apparatus of a UE 102, eNB 104, gNB 105 and/or other device described above.

It should be noted that references to an eNB 104 (such as in descriptions of the method 600 and/or other descriptions) are not limiting. In some embodiments, a gNB 105 may perform one or more operations of the method 600. In some embodiments, an eNB 104 configured to operate as a gNB 105 may perform one or more operations of the method 600.

In some embodiments, an eNB 104 may perform one or more operations of the method 600, but embodiments are not limited to performance of the method 600 and/or operations of it by the eNB 104. In some embodiments, the gNB 105 may perform one or more operations of the method 600 (and/or similar operations). In some embodiments, an eNB 104 may be configured to operate as a gNB 105 and may perform one or more operations of the method 600 (and/or similar operations). In some embodiments, the UE 102 may perform one or more operations of the method 600 (and/or similar operations). Accordingly, although references may be made to performance of one or more operations of the method 600 by the eNB 104 in descriptions herein, it is understood that the UE 102 may perform the same operation (s), similar operation(s) and/or reciprocal operation(s), in some embodiments.

It should be noted that the method 600 may be practiced by an eNB 104 and may include exchanging of elements, such as frames, signals, messages and/or other elements, with a UE 102. Similarly, the method 500 may be practiced by a UE 102 and may include exchanging of such elements with an eNB 104. In some cases, operations and techniques described as part of the method 500 may be relevant to the method 600. In addition, embodiments of the method 600 may include one or more operations performed by the eNB 104 that may be the same as, similar to or reciprocal to one or more operations described herein performed by the UE 102 (including but not limited to operations of the method 500). For instance, an operation of the method 500 may include reception of an element (such as a frame, block, message and/or other) by a UE 102 and the method 600 may include transmission of a same or similar element by the eNB 104.

In addition, previous discussion of various techniques and concepts may be applicable to the method 600 in some cases, including MSI, RMSI, MIB, SIB, RRC signaling, TB, TBS, DCI, code blocks, code block groups, HARQ, HARQ bits, bundle sizes, candidate bundle sizes, technique(s) to determine a number of HARQ bits, technique(s) to bundle code blocks into code block groups, technique(s) to determine code block groups, technique(s) to determine a number of code block groups and/or others. In addition, the examples shown in FIGS. 7-9 may also be applicable, in some cases, although the scope of embodiments is not limited in this respect.

At operation 605, the eNB 104 may transmit an MSI, RMSI and/or SIB. At operation 610, the eNB 104 may transmit RRC signaling. It should be noted that some embodiments may not necessarily include all operations shown in FIG. 6. In some embodiments, the eNB 104 may perform one of operations 605-610 but may not necessarily perform both operations 605-610. In some embodiments, the eNB 104 may perform both of operations 605-610.

At operation 615, the eNB 104 may transmit a DCI that schedules a downlink transport block (TB). At operation 620, the eNB 104 may determine a TBS. At operation 625, the eNB 104 may determine code block groups.

In some embodiments, the TB may include multiple code blocks. The DCI may include information related to the TB, including but not limited to time resources for the TB, frequency resources for the TB, a modulation and coding scheme (MCS) for the TB, a number of symbols (such as symbol periods, OFDM symbol periods and/or other), a size of the TB, a number of code blocks in the TB, a bundle size for bundling of code blocks and/or other. In some embodiments, the eNB 104 may determine the TBS based at least partly on such information. In some embodiments, the TBS may be based at least partly on such information.

In some embodiments, one or more of the techniques described herein for determination of code block groups by the UE 102 may be used by the eNB 104. In some embodiments, one or more techniques that are similar to one or more of the techniques described herein for determination of code block groups by the UE 102 may be used by the eNB 104. The scope of embodiments is not limited to usage of techniques that are the same as or similar to those techniques described herein, however, as any suitable technique(s) may be used to determine the code block groups.

At operation 630, the eNB 104 may receive one or more HARQ bits. In some embodiments, one or more of the techniques described herein for determination of the HARQ bits by the UE 102 may be applicable to operation 630. For instance, the received HARQ bits may be encoded and/or formatted in accordance with one or more techniques described herein. The eNB 104 may determine the meaning of the HARQ bit(s) accordingly. For instance, the eNB 104 may determine whether code block groups are used, a mapping between HARQ bit(s) and code block groups, whether the HARQ bit(s) indicate a first chronological code block for which a decode failure occurs and/or other information. The scope of embodiments is not limited to usage of techniques that are the same as or similar to those techniques described herein, however, as any suitable technique(s) may be used to determine the meaning of the HARQ bits.

In some embodiments, the eNB 104 may transmit, to the UE 102, a transport block (TB) that includes multiple code blocks. The eNB 104 may determine, based on a transport block size (TBS), a bundle size to be used to bundle the code blocks into code block groups for hybrid automatic repeat request (HARQ) of the TB. In a non-limiting example, the bundle size may indicate a number of code blocks per code block group. In another non-limiting example, the bundle size may indicate a number of code block groups per TB. The eNB 104 may transmit, to the UE 102, downlink control information (DCI) that schedules a downlink transmission of the TB. The DCI may include the bundle size. The eNB 104 may decode HARQ bits from the UE 102 in accordance with a mapping between the HARQ bits and the code block groups. The HARQ bit for a particular code block group may indicate whether a decode failure has occurred, at the UE 102, for at least one of the code blocks of the particular code block group.

In some embodiments, the eNB 104 and/or UE 102 may determine the bundle size based on a non-decreasing relationship between the bundle size and the TBS. In a non-limiting example, the eNB 104 and/or UE 102 may determine a first bundle size for a first TBS and may determine a second bundle size for a second TBS. In accordance with the non-decreasing relationship, if the first TBS is greater than the second TBS, the first bundle size may be greater than or equal to the second bundle size. This may be true for some or all possible combinations of first TBS and second TBS, in some embodiments.

In some embodiments, the eNB 104 may transmit an MSI, an RMSI, an SIB and/or radio resource control (RRC) signaling. The MSI, RMSI, SIB and/or RRC signaling may include candidate bundle sizes. The eNB 104 may encode the DCI to indicate the bundle size as one of the candidate bundle sizes.

Figure 7:
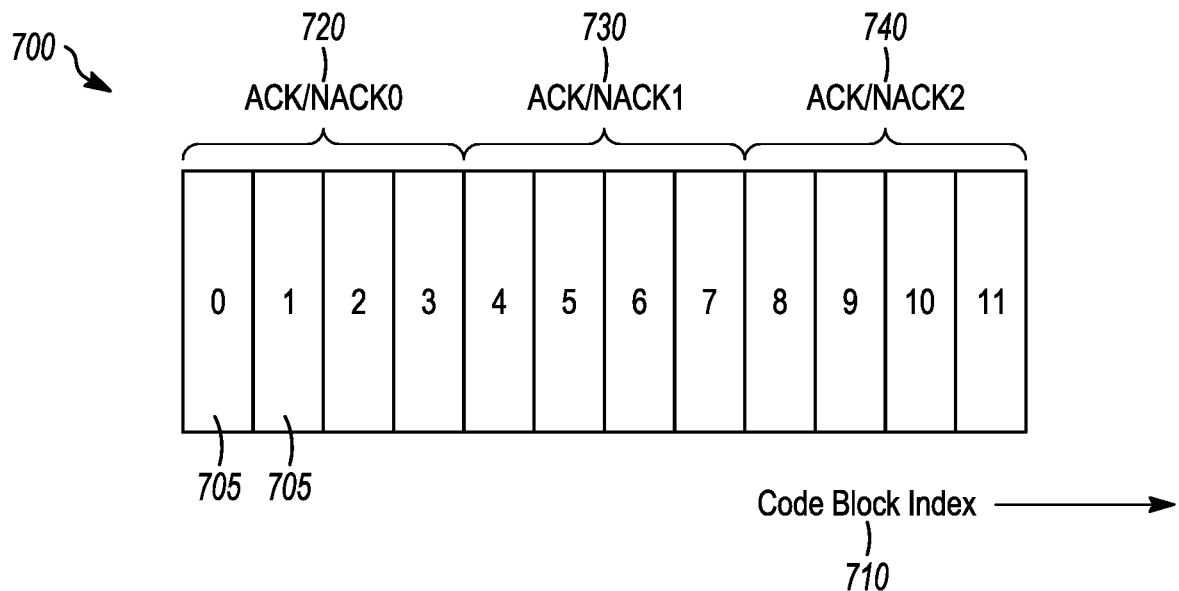
FIG. 7 illustrates an example of hybrid automatic repeat request (HARQ) in accordance with some embodiments.
Figure 8:
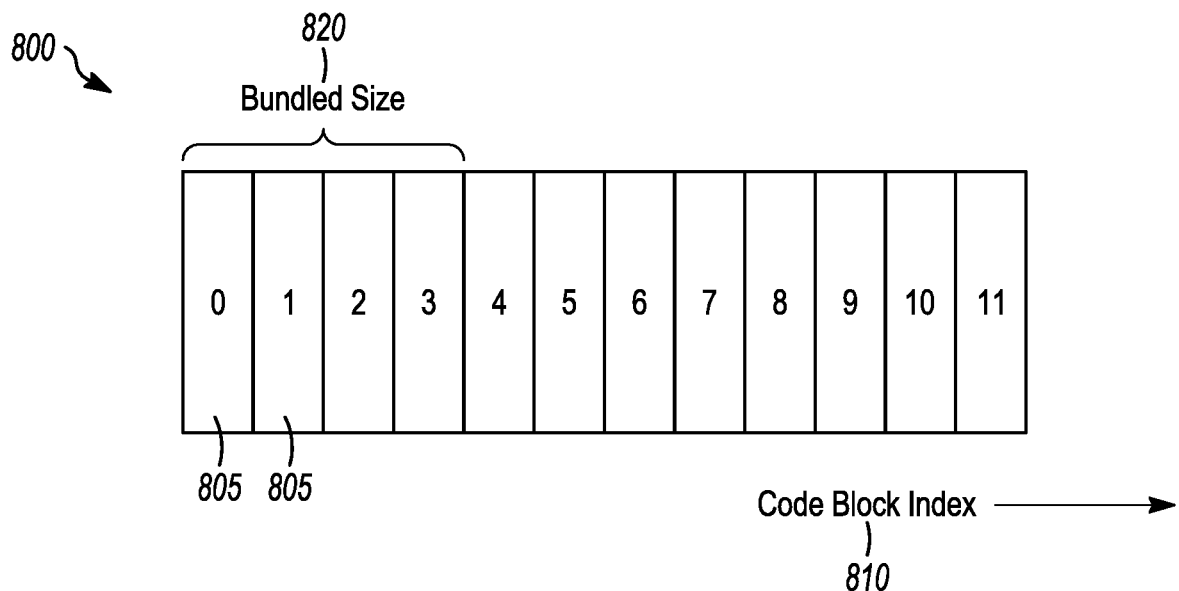
FIG. 8 illustrates another example of HARQ in accordance with some embodiments.
Figure 9:
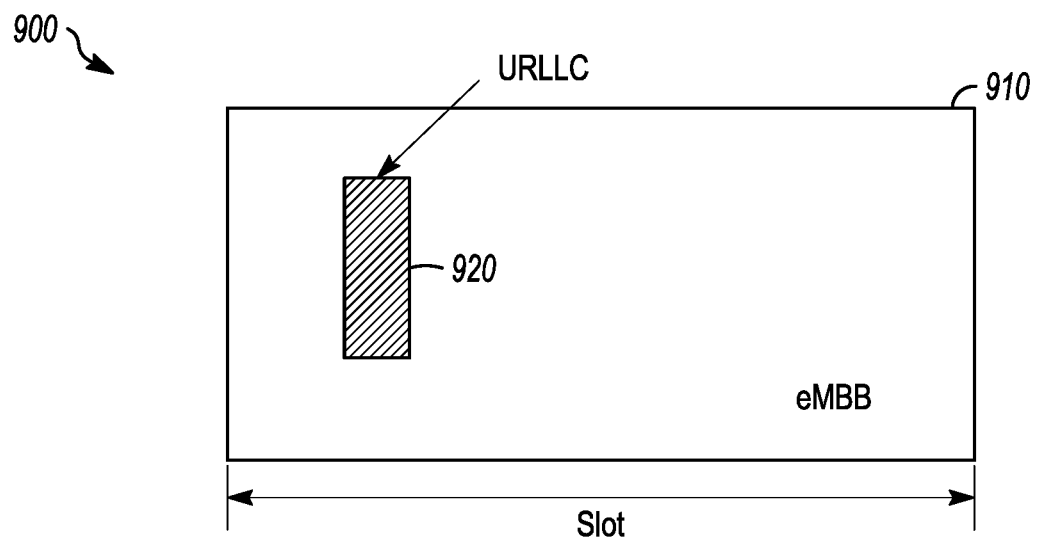
FIG. 9 illustrates an example of puncturing in accordance with some embodiments.
Figure 10:
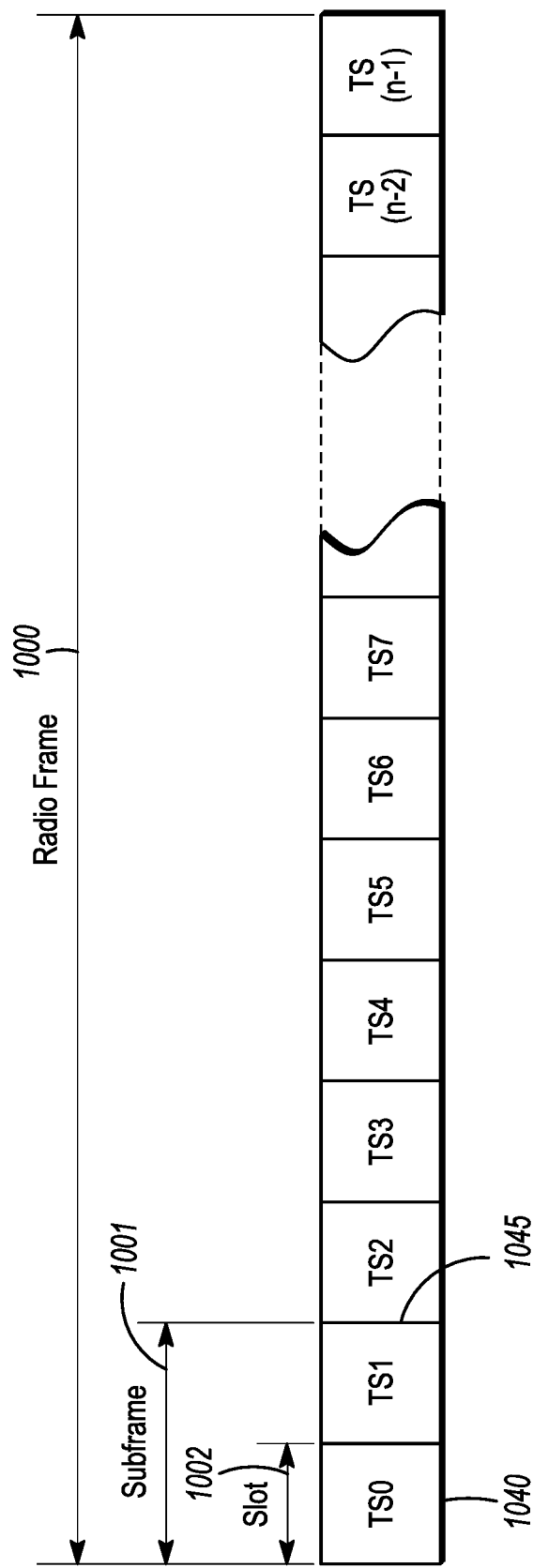
FIG. 10 illustrates an example radio frame structure in accordance with some embodiments.
Figure 12:
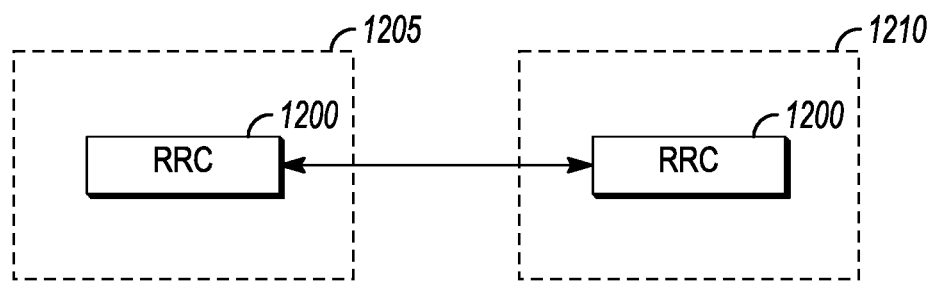
FIG. 12 illustrates an example of entities exchanging radio resource control (RRC) elements in accordance with some embodiments.
Figure 13:
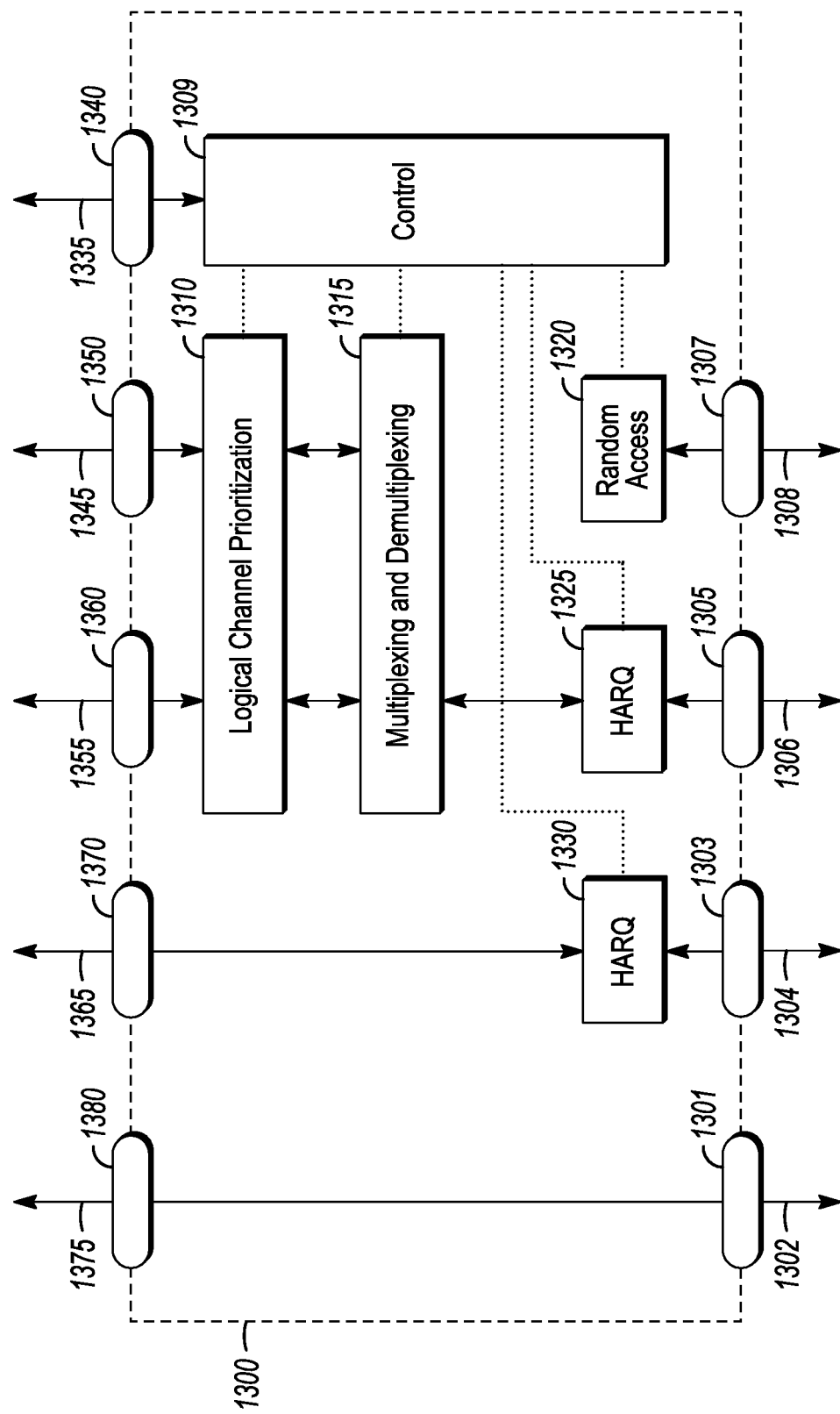
FIG. 13 illustrates an example entity that may be used to implement medium access control (MAC) layer functions in accordance with some embodiments.

FIG. 7 illustrates an example of hybrid automatic repeat request (HARQ) in accordance with some embodiments. FIG. 8 illustrates another example of HARQ in accordance with some embodiments. FIG. 9 illustrates an example of puncturing in accordance with some embodiments. FIG. 10 illustrates an example radio frame structure in accordance with some embodiments. FIG. 11 illustrates example frequency resources in accordance with some embodiments. FIG. 12 illustrates an example of entities exchanging radio resource control (RRC) elements in accordance with some embodiments. FIG. 13 illustrates an example entity that may be used to implement medium access control (MAC) layer functions in accordance with some embodiments. It should be noted that the examples shown in FIGS. 7-13 may illustrate some or all of the concepts and techniques described herein in some cases, but embodiments are not limited by the examples. For instance, embodiments are not limited by the name, number, type, size, ordering, arrangement and/or other aspects of the operations, time resources, frequency resources, code blocks, code block groups, transport blocks (TBs), transport block sizes (TBSs), data regions and other elements as shown in FIGS. 7-13. Although some of the elements shown in the examples of FIGS. 7-13 may be included in a 3GPP LTE standard, 5G standard, NR standard and/or other standard, embodiments are not limited to usage of such elements that are included in standards.

In some scenarios, an NR protocol may enable higher data rates compared to other protocols, such as 3GPP LTE protocols, legacy protocols and/or other. In a non-limiting example, a NR protocol may be capable of a peak data rate of more than 10 Gps and a minimum guaranteed user data rate of at least 100 Mbps. To support the higher data rate for NR, a larger system bandwidth (in comparison to other systems, such as 3GPP LTE and other(s)) may be used. For instance, a carrier frequency above 6 GHz may be used, including but not limited to cmWave frequencies and/or mmWave frequencies. In some embodiments, multiple code blocks for one transport block may be transmitted in one slot.

In some embodiments, a hybrid automatic repeat request-acknowledgement (HARQ-ACK) bit may be used to indicate whether one transport block is successfully decoded. Given that a large number of code blocks may be supported in NR, one bit HARQ-ACK feedback for one transport block may not be desirable, especially when considering the retransmission. In cases when the receiver fails to decode the transport block and feeds back NACK to the transmitter, the transmitter may retransmit the whole transport block, which may consume a substantial amount of resources for retransmission.

In some embodiments, HARQ-ACK for multiple code blocks may be bundled to reduce HARQ-ACK feedback overhead. In some cases, the bundled size may be semi-statically configured by higher layers. Referring to FIG. 7, an example of code block specific HARQ-ACK feedback is shown. In this example, one transport block includes 12 code blocks 705 and a bundled size for HARQ-ACK feedback is 4. In this case, 3 HARQ-ACK bits are used to indicate whether 3 sub-transport blocks (720, 730 and 740) are successfully decoded, where each sub-transport block includes 4 code blocks 705.

In an example scenario, UEs 102 operating in relatively good channel conditions (for instance, cell centered UEs 102), the gNB 105 may schedule the transmission of transport blocks with a large payload size and a high coding rate. However, for cell edge UEs 102, coverage may be a dominant factor and in this case, transport blocks with a low coding rate and a small payload size may be scheduled. In some cases, an improved link budget may be realized as a result. For UEs that experience high mobility, channel conditions may change frequently. Accordingly, a dynamic code block HARQ-ACK mechanism may be used for UEs 102 in different conditions, in some embodiments.

In some embodiments, a technique for adaptive code block HARQ-ACK feedback for NR may be used. It should be noted that although the technique may be described herein for HARQ-ACK feedback for data transmission which spans one slot, the design principle may be extended to the HARQ-ACK feedback for multiple data transmissions, in some embodiments.

In some embodiments, a number of HARQ-ACK feedback bits may be implicitly derived from the transport block size (TBS) for the scheduled data transmission. For instance, one or more TBS thresholds may be used to determine a number of HARQ-ACK feedback bits and/or a bundle size for HARQ-ACK for multiple code blocks. In a non-limiting example, the TBS threshold(s) may be predefined in the specification. In another non-limiting example, the TBS threshold(s) may be configured by higher layers via MSI, RMSI, SIB and/or RRC signaling.

In a non-limiting example, a TBS threshold may be defined. If the TBS is greater than the TBS threshold, a 2 bit HARQ-ACK may be determined. For instance, a first bit may be used to indicate whether the first half of transport block is successfully decoded. A second bit may be used to indicate whether the second half of the transport block is successfully decoded. In other words, with "Kcb" code blocks, HARQ-ACK feedback bits for code blocks of index 0 through floor(Kcb/2) may be bundled while HARQ-ACK feedback bits for code blocks of index (floor(Kcb/2)+1) through (Kcb−1) may be bundled.

In another non-limiting example, three TBS thresholds may be defined. A number of HARQ-ACK bits may be determined by a technique such as follows—

$$\begin{cases} L = 1, TBS \leq Threshold_0 \\ L = 2, Threshold_0 < TBS \leq Threshold_1 \\ L = 3, Threshold_1 < TBS \leq Threshold_2 \\ L = 4, TBS > Threshold_2 \end{cases}$$

In the above, L is the number of HARQ-ACK feedback bits.

In some embodiments, bundled sizes for code block based HARQ-ACK may be dynamically indicated in the downlink control information (DCI) for downlink or uplink grant. In a non-limiting example, bundled sizes may be configured by higher layers via MSI, RMSI, SIB and/or RRC signaling. As shown in the table below, one field in the DCI may be used to indicate which bundled size is applied for HARQ-ACK feedback for the scheduled transport block. In a non-limiting example, in case bundled size=0, this may be used to indicate that no HARQ-ACK bundling is applied, i.e., the receiver only feeds back one bit for one transport block.

| Field in the DCI | Bundled size |
| --- | --- |
| 00 | A first bundled size configured by higher layers |
| 01 | A second bundled size configured by higher layers |
| 10 | A third bundled size configured by higher layers |
| 11 | A fourth bundled size configured by higher layers |

In a non-limiting example, four bundled sizes {0, 2, 4, 8} may be configured by higher layers. In the DCI, bit "10" may be used to indicate that a bundled size of 4 is applied for code block based HARQ-ACK feedback, as shown in FIG. 8.

In some cases, a channel condition may be highly correlated (such as in time). When the receiver fails to decode certain code blocks, decoding for subsequent code blocks may likely fail. In some embodiments, the receiver may feedback code block based HARQ-ACK based on an ACK and NACK pattern. In a non-limiting example, assuming four sub-transport blocks, the receiver may feedback the HARQ-ACK bit based on the following pattern: 1) for bits "00": ACK, NACK, xx, xx, 2) for bits "01": ACK, ACK, NACK, xx, 3) for bits "10": ACK, ACK, ACK, NACK, 4) for bits "11": ACK, ACK, ACK, ACK. In the above, "xx" indicates either ACK or NACK for the corresponding sub-transport block. Note that this mechanism can substantially reduce the HARQ-ACK feedback overhead. For instance, with four sub-transport blocks, 4 HARQ-ACK bits may be used. Based on the above example, the number of HARQ-ACK bits may be reduced to 2.

In some cases, enhanced mobile broadband (eMBB) and ultra-reliable and low latency communications (URLCC) may operate in accordance with different user plane latency and coverage levels. For instance, URLLC may operate with targets such as: 1) user plane latency of 0.5 ms for UL, and 0.5 ms for DL, 2) reliability of $1-10^{-5}$ within 1 ms. In some embodiments, to support efficient multiplexing of eMBB and URLLC services in the same carrier, puncturing the eMBB data region by URLLC data may be used. In some cases, a good efficiency in terms of resource utilization may be provided, as both URLLC and eMBB may be scheduled on demand.

In some embodiments, an eMBB data region may be punctured by URLLC data. Different latencies for URLLC and eMBB may be realized, in some cases. A non-limiting example is shown in FIG. 9, in which the eMBB region 910 may be punctured by the URLLC region 920.

To improve the spectrum efficiency for eMBB, such as for retransmission, code block specific HARQ-ACK feedback may be applied for eMBB data. In some embodiments, given that URLLC may puncture a certain number of code blocks for eMBB, the receiver may feedback the first code block index or sub-transport block which is not successfully decoded. To further reduce the signaling overhead, the receiver may feedback the position of a first bundled NACK for sub-transport block.

In a non-limiting example, assuming four sub-transport blocks, in case when the 2nd (such as 2nd chronologically) sub-transport block is not decoded successfully, the receiver may feedback bit values of "01" for HARQ-ACK. In some cases, such a technique may enable a savings in terms of HARQ-ACK feedback overhead.

An example of a radio frame structure that may be used in some aspects is shown in FIG. 10. In this example, radio frame 1000 has a duration of 10 ms. Radio frame 1000 is divided into slots 1002 each of duration 0.5 ms, and numbered from 0 to 19. Additionally, each pair of adjacent slots $D102 numbered 2i and 2=i+1, where i is an integer, is referred to as a subframe 1001.

In some aspects using the radio frame format of FIG. 10, each subframe 1001 may include a combination of one or more of downlink control information, downlink data information, uplink control information and uplink data information. The combination of information types and direction may be selected independently for each subframe 1001.

In some aspects, a sub-component of a transmitted signal consisting of one subcarrier in the frequency domain and one symbol interval in the time domain may be termed a resource element. Resource elements may be depicted in a grid form as shown in FIG. 11A and FIG. 11B.

Figures 11A, 11B:
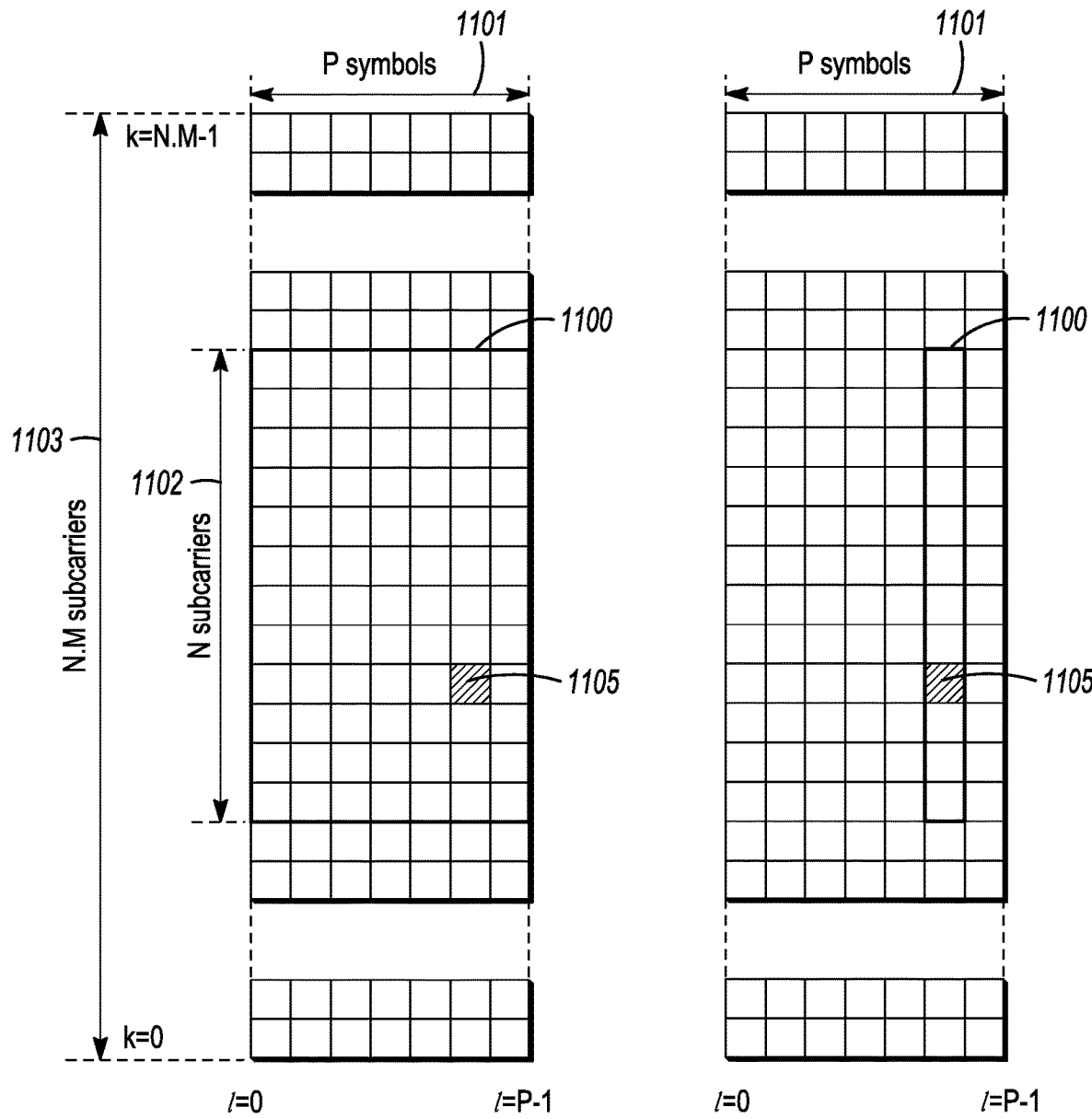
FIGS. 11A-B illustrate example frequency resources in accordance with some embodiments.

In some aspects, illustrated in FIG. 11A, resource elements may be grouped into rectangular resource blocks 1100 consisting of 12 subcarriers in the frequency domain and the P symbols in the time domain, where P may correspond to the number of symbols contained in one slot, and may be 6, 7, or any other suitable number of symbols.

In some alternative aspects, illustrated in FIG. 11B, resource elements may be grouped into resource blocks 1100 consisting of 12 subcarriers (as indicated by 1102) in the frequency domain and one symbol in the time domain. In the depictions of FIG. 11A and FIG. 11B, each resource element 1105 may be indexed as (k, l) where k is the index number of subcarrier, in the range 0 to N·M−1 (as indicated by 1103), where N is the number of subcarriers in a resource block, and M is the number of resource blocks spanning a component carrier in the frequency domain.

Some aspects of communication between instances of radio resource control (RRC) layer 1200 are illustrated in FIG. 12. According to an aspect, an instance of RRC 1200 contained in a user equipment (UE) 1205 may encode and decode messages, transmitted to and received from respectively, a peer RRC instance 1200 contained in a base station 1210 which may be an evolved node B (eNodeB), gNodeB or other base station instance.

According to an aspect, an RRC 1200 instance may encode or decode broadcast messages, which may include one or more of system information, cell selection and reselection parameters, neighboring cell information, common channel configuration parameters, and other broadcast management information.

According to an aspect, an RRC 1200 instance may encode or decode RRC connection control messages, which may include one or more of paging information, messages to establish, modify, suspend, resume or release RRC connection, messages to assign or modify UE identity, which may include a cell radio network temporary identifier (C-RNTI), messages to establish, modify or release a signaling radio bearer (SRB), data radio bearer (DRB) or QoS flow, messages to establish, modify or release security associations including integrity protection and ciphering information, messages to control inter-frequency, intra-frequency and inter-radio access technology (RAT) handover, messages to recover from radio link failure, messages to configure and report measurement information, and other management control and information functions.

An entity 1300 that may be used to implement medium access control layer functions according to an aspect is illustrated in FIG. 13. According to some aspects, MAC entity 1300 may include one or more of a controller 1305, a logical channel prioritizing unit 1310, a channel multiplexer & de-multiplexer 1315, a PDU filter unit 1315, random access protocol entity 1320, data hybrid automatic repeat request protocol (HARQ) entity 1325 and broadcast HARQ entity 1330.

According to some aspects, a higher layer may exchange control and status messages 1335 with controller 1305 via management service access point 1340. According to some aspects, MAC service data units (SDU) corresponding to one or more logical channels 1345, 1355, 1365 and 1375 may be exchanged with MAC entity 1300 via one or more service access points (SAP) 1350, 1360, 1370 and 1380. According to some aspects, PHY service data units (SDU) corresponding to one or more transport channels 1302, 1304, 1306, 1308 may be exchanged with a physical layer entity via one or more service access points (SAP) 1301, 1303, 1305, 1307.

According to some aspects, logical channel prioritization unit 1310 may perform prioritization amongst one or more logical channels 1345 and 1355, which may include storing parameters and/or state information corresponding to each of the one or more logical channels. Such parameters and/or state information may be initialized when a logical channel is established. According to some aspects, logical channel prioritization unit 1310 may be configured with a set of parameters for each of one or more logical channels 1345 and 1355, the each set including parameters which may include one or more of a prioritized bit rate (PBR) and a bucket size duration (BSD).

According to some aspects, multiplexer & de-multiplexer 1315 may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, multiplexer & de-multiplexer 1315 may separate one or more MAC-SDUs or partial MAC-SDUs contained in a received MAC PDU, corresponding to one or more logical channels 1345 and 1355, and may indicate the one or more MAC-SDUs or partial MAC-SDUs to a higher layer via one or more service access points 1350 and 1360.

According to some aspects, HARQ entity 1325 and broadcast HARQ entity 1330 may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity 1330 may retransmit a same TB in successive transmit intervals a predetermined number of times. According to some aspects, a transmit HARQ process included in a HARQ entity 1325 may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally be based on the stored data based on previously received data for the TB.

In Example 1, an apparatus of a User Equipment (UE) may comprise memory. The apparatus may further comprise processing circuitry. The processing circuitry may be configured to decode downlink control information (DCI) that schedules a downlink transmission of a transport block (TB). The TB may include multiple code blocks. The processing circuitry may be further configured to determine a transport block size (TBS) based on the DCI. The processing circuitry may be further configured to attempt to decode the code blocks. The processing circuitry may be further configured to, if the TBS is greater than a predetermined threshold: bundle the code blocks into code block groups for hybrid automatic repeat request (HARQ) acknowledgement; and encode, for transmission, a HARQ bit per code block group. The HARQ bit for a particular code block group may indicate whether a decode failure has occurred for at least one of the code blocks of the particular code block group. The processing circuitry may be further configured to, if the TBS is less than or equal to the threshold: encode, for transmission, a HARQ bit that indicates whether a decode failure has occurred for at least one of the code blocks of the TB.

In Example 2, the subject matter of Example 1, wherein the processing circuitry may be further configured to, if the TBS is greater than the threshold: bundle the code blocks into the code block groups based on a bundle size indicated in the DCI. The bundle size may indicate a number of code blocks per code block group or a number of code block groups per TB.

In Example 3, the subject matter of one or any combination of Examples 1-2, wherein the processing circuitry may be further configured to decode a minimum system information (MSI), a remaining minimum system information (RMSI), a system information block (SIB) or radio resource control (RRC) signaling. The MSI, RMSI, SIB or RRC signaling may include candidate bundle sizes. The processing circuitry may be further configured to, if the TBS is greater than the threshold, select the bundle size from the candidate bundle sizes based on an indicator included in the DCI.

In Example 4, the subject matter of one or any combination of Examples 1-3, wherein the processing circuitry may be further configured to decode radio resource control (RRC) signaling. The processing circuitry may be further configured to, if the TBS is greater than the threshold: bundle the code blocks into the code block groups based on a bundle size indicated in the RRC signaling. The bundle size may indicate a number of code blocks per code block group or a number of code block groups per TB.

In Example 5, the subject matter of one or any combination of Examples 1-4, wherein the processing circuitry may be further configured to, if the TBS is greater than the threshold: bundle the code blocks to include one or more contiguous code blocks per code block group.

In Example 6, the subject matter of one or any combination of Examples 1-5, wherein the processing circuitry may be further configured to decode a minimum system information (MSI) that includes the predetermined threshold, a remaining minimum system information (RMSI) that includes the predetermined threshold or a system information block (SIB) that includes the predetermined threshold.

In Example 7, the subject matter of one or any combination of Examples 1-6, wherein the processing circuitry may be further configured to decode radio resource control (RRC) signaling that includes the predetermined threshold.

In Example 8, the subject matter of one or any combination of Examples 1-7, wherein the processing circuitry may be further configured to decode a minimum system information (MSI), a remaining minimum system information (RMSI), a system information block (SIB) or radio resource control (RRC) signaling. The MSI, RMSI, SIB or RRC signaling may include a bundle size. The bundle size may indicate a number of code blocks per code block group or a number of code block groups per TB. The processing circuitry may be further configured to, if the TBS is greater than the threshold: bundle the code blocks into the code block groups based on the bundle size.

In Example 9, the subject matter of one or any combination of Examples 1-8, wherein the threshold is a first threshold. The processing circuitry may be further configured to, if the TBS is greater than the first threshold and less than or equal to a second predetermined threshold, bundle the code blocks into the code block groups based on a first bundle size. The processing circuitry may be further configured to, if the TBS is greater than the second threshold, bundle the code blocks into the code block groups based on a second bundle size.

In Example 10, the subject matter of one or any combination of Examples 1-9, wherein the threshold is a first threshold that is included in a plurality of predetermined thresholds. The processing circuitry may be further configured to, if the TBS is greater than the first threshold: compare the TBS with the one or more other thresholds of the plurality; and determine a number of the code block groups to be used based on a predetermined mapping between the number of the code block groups and the thresholds of the plurality.

In Example 11, the subject matter of one or any combination of Examples 1-10, wherein the UE may be arranged to operate in accordance with a new radio (NR) protocol.

In Example 12, the subject matter of one or any combination of Examples 1-11, wherein the memory may be configurable to store the TBS.

In Example 13, the subject matter of one or any combination of Examples 1-12, wherein the apparatus may further include a transceiver to receive the TB.

In Example 14, the subject matter of one or any combination of Examples 1-13, wherein the processing circuitry may include a baseband processor to decode the DCI and to determine the TBS.

In Example 15, a computer-readable storage medium may store instructions for execution by one or more processors to perform operations for communication by a User Equipment (UE). The operations may configure the one or more processors to decode downlink control information (DCI) that schedules a downlink transmission of a transport block (TB). The TB may include a sequence of code blocks. The operations may further configure the one or more processors to attempt to decode the sequence of code blocks. The operations may configure the one or more processors to, if a decode failure occurs for at least one of the code blocks: encode, for transmission, hybrid automatic repeat request (HARQ) bits to indicate a first chronological code block of the sequence for which one of the decode failures has occurred. The operations may configure the one or more processors to, if the code blocks of the TB have been decoded successfully: encode, for transmission, the HARQ bits to a particular value that is reserved to indicate that the code blocks of the TB have been decoded successfully.

In Example 16, the subject matter of Example 15, wherein the operations may further configure the one or more processors to determine a transport block size (TBS) based on the DCI. The operations may configure the one or more processors to determine, based on the TBS, a number of HARQ bits to be encoded.

In Example 17, the subject matter of one or any combination of Examples 15-16, wherein the operations may further configure the one or more processors to determine a number of code blocks in the TB based on the DCI. The operations may configure the one or more processors to determine the number of HARQ bits to be encoded based at least partly on the number of code blocks in the TB.

In Example 18, an apparatus of an Evolved Node-B (eNB) may comprise memory. The apparatus may comprise processing circuitry. The processing circuitry may be configured to encode, for transmission to a User Equipment (UE), a transport block (TB) that includes multiple code blocks. The processing circuitry may be further configured to determine, based on a transport block size (TBS), a bundle size to be used to bundle the code blocks into code block groups for hybrid automatic repeat request (HARQ) of the TB. The bundle size indicates a number of code blocks per code block group. The processing circuitry may be further configured to encode, for transmission to the UE, downlink control information (DCI) that schedules a downlink transmission of the TB. The DCI may include the bundle size. The processing circuitry may be further configured to decode HARQ bits from the UE in accordance with a mapping between the HARQ bits and the code block groups. The HARQ bit for a particular code block group may indicate whether a decode failure has occurred, at the UE, for at least one of the code blocks of the particular code block group.

In Example 19, the subject matter of Example 18, wherein the processing circuitry may be further configured to determine the bundle size based on a non-decreasing relationship between the bundle size and the TBS.

In Example 20, the subject matter of one or any combination of Examples 18-19, wherein the processing circuitry may be further configured to encode a minimum system information (MSI), a remaining minimum system information (RMSI), a system information block (SIB) or radio resource control (RRC) signaling. The MSI, RMSI, SIB or RRC signaling may include candidate bundle sizes. The processing circuitry may be further configured to encode the DCI to indicate the bundle size as one of the candidate bundle sizes.

In Example 21, an apparatus of a User Equipment (UE) may comprise means for decoding downlink control information (DCI) that schedules a downlink transmission of a transport block (TB). The TB may include a sequence of code blocks. The apparatus may further comprise means for attempting to decode the sequence of code blocks. The apparatus may further comprise means for, if a decode failure occurs for at least one of the code blocks: encoding, for transmission, hybrid automatic repeat request (HARQ) bits to indicate a first chronological code block of the sequence for which one of the decode failures has occurred. The apparatus may further comprise means for, if the code blocks of the TB have been decoded successfully: encoding, for transmission, the HARQ bits to a particular value that is reserved to indicate that the code blocks of the TB have been decoded successfully.

In Example 22, the subject matter of Example 21, wherein the apparatus may further comprise means for determining a transport block size (TBS) based on the DCI. The apparatus may further comprise means for determining, based on the TBS, a number of HARQ bits to be encoded.

In Example 23, the subject matter of one or any combination of Examples 21-22, wherein the apparatus may further comprise means for determining a number of code blocks in the TB based on the DCI. The apparatus may further comprise means for determining the number of HARQ bits to be encoded based at least partly on the number of code blocks in the TB.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a User Equipment (UE), the apparatus comprising:
    one or more processors, configured to:
        decode downlink control information (DCI) that schedules a downlink transmission of a transport block (TB), wherein the transmission of the TB is comprised of one or more code blocks;
        determine a transport block size (TBS) based on the DCI;
        attempt to decode the one or more code blocks;
        dynamically determine a number of hybrid automatic repeat request (HARQ) bits based on a plurality of predetermined thresholds, wherein the plurality of predetermined thresholds includes three thresholds, and wherein the plurality of predetermined thresholds determines the number of code block groups;
    wherein:
        if the TBS is greater than a first predetermined threshold:
            bundle the one or more code blocks into code block groups for HARQ acknowledgement; and
            encode, for transmission, a HARQ bit per code block group, wherein the HARQ bit for a particular code block group indicates whether a decode failure has occurred for at least one of the one or more code blocks of the particular code block group; and
        if the TBS is less than or equal to a second predetermined threshold:
            encode, for transmission, a HARQ bit that indicates whether a decode failure has occurred for at least one of the one or more code blocks of the TB.

2. The apparatus according to claim 1, the one or more processors further configured to:
if the TBS is greater than the first predetermined threshold:
bundle the one or more code blocks into the code block groups based on a bundle size indicated in the DCI, wherein the bundle size indicates a number of code blocks per code block group or a number of code block groups per TB.

3. The apparatus according to claim 2, the one or more processors further configured to:
decode a minimum system information (MSI), a remaining minimum system information (RMSI), a system information block (SIB) or radio resource control (RRC) signaling, wherein the MSI, RMSI, SIB or RRC signaling includes candidate bundle sizes; and
if the TBS is greater than the first predetermined threshold, select the bundle size from the candidate bundle sizes based on an indicator included in the DCI.

4. The apparatus according to claim 1, the one or more processors further configured to:
decode radio resource control (RRC) signaling; and
if the TBS is greater than the first predetermined threshold:
bundle the one or more code blocks into the code block groups based on a bundle size indicated in the RRC signaling, wherein the bundle size indicates a number of code blocks per code block group or a number of code block groups per TB.

5. The apparatus according to claim 1, the one or more processors further configured to:
if the TBS is greater than the first predetermined threshold:
bundle the one or more code blocks to include one or more contiguous code blocks per code block group.

6. The apparatus according to claim 1, the one or more processors further configured to:
decode a minimum system information (MSI) that includes the first predetermined threshold, a remaining minimum system information (RMSI) that includes the first predetermined threshold or a system information block (SIB) that includes the first predetermined threshold.

7. The apparatus according to claim 1, the one or more processors further configured to:
decode radio resource control (RRC) signaling that includes the predetermined threshold.

8. The apparatus according to claim 1, the one or more processors further configured to:
decode a minimum system information (MSI), a remaining minimum system information (RMSI), a system information block (SIB) or radio resource control (RRC) signaling,
wherein the MSI, RMSI, SIB or RRC signaling includes a bundle size,
wherein the bundle size indicates a number of code blocks per code block group or a number of code block groups per TB; and
if the TBS is greater than the first predetermined threshold:
bundle the one or more code blocks into the code block groups based on the bundle size.

9. The apparatus according to claim 1, wherein:
the one or more processors are further configured to:
if the TBS is greater than the first predetermined threshold and less than or equal to the second predetermined threshold, bundle the one or more code blocks into the code block groups based on a first bundle size; and
if the TBS is greater than the second predetermined threshold, bundle the one or more code blocks into the code block groups based on a second bundle size.

10. The apparatus according to claim 1, wherein:
the first predetermined threshold is included in a plurality of predetermined thresholds,
the one or more processors are further configured to, if the TBS is greater than the first predetermined threshold:
compare the TBS with the one or more other predetermined thresholds of the plurality; and
determine a number of the code block groups to be used based on a predetermined mapping between the number of the code block groups and the thresholds of the plurality.

11. The apparatus according to claim 1, wherein the UE is arranged to operate in accordance with a new radio (NR) protocol.

12. The apparatus according to claim 1, wherein the apparatus further includes a memory is configurable to store the TBS.

13. The apparatus according to claim 1, wherein the apparatus further includes a transceiver to receive the TB.

14. The apparatus according to claim 1, wherein the one or more processors include a baseband processor to decode the DCI and to determine the TBS.

15. A User Equipment device (UE), comprising:
a radio; and
a processor operably coupled to the radio and configured to cause the UE to:
decode downlink control information (DCI) that schedules a downlink transmission of a transport block (TB), wherein the transmission of the TB is comprised of one or more code blocks;
determine a transport block size (TBS) based on the DCI;
attempt to decode the one or more code blocks; and
dynamically determine a number of hybrid automatic repeat request (HARQ) bits based on a plurality of predetermined thresholds, wherein the plurality of predetermined thresholds includes three thresholds, and encode, for transmission, a number of HARQ bits according to the TBS, wherein the plurality of predetermined thresholds determines the number of code block groups; wherein:
if the TBS is greater than a first predetermined threshold, the processor is further configured to cause the UE to bundle the one or more code blocks into code block groups, wherein respective HARQ bits for respective code block groups indicate whether a decode failure has occurred for the respective code block groups; and
if the TBS is less than or equal to a second predetermined threshold, a HARQ bit indicates whether a decode failure has occurred for at least one of the one or more code blocks of the TB.

16. The UE of claim 15, wherein to bundle the one or more code blocks into code block groups includes selecting a bundle size based on a comparison of the TBS to the second predetermined threshold.

17. The UE of claim 15, wherein to bundle the one or more code blocks into code block groups includes selecting a bundle size based on an indicator in the DCI.

18. A non-transitory computer-readable memory medium, wherein the non-transitory computer-readable memory medium comprises program instructions that are executable to:
- decode downlink control information (DCI) that schedules a downlink transmission of a transport block (TB), wherein the transmission of the TB is comprised of one or more code blocks;
- determine a transport block size (TBS) based on the DCI;
- attempt to decode the one or more code blocks;
- dynamically determine a number of hybrid automatic repeat request (HARQ) bits based on a plurality of predetermined thresholds, wherein the plurality of predetermined thresholds includes three thresholds, and wherein the plurality of predetermined thresholds determines the number of code block groups; wherein:
- if the TBS is greater than a first predetermined threshold:
  - bundle the one or more code blocks into code block groups for HARQ-acknowledgement; and
  - encode, for transmission, a HARQ bit per code block group, wherein the HARQ bit for a particular code block group indicates whether a decode failure has occurred for at least one of the one or more code blocks of the particular code block group; and
- if the TBS is less than or equal to a second predetermined threshold:
  - encode, for transmission, a HARQ bit that indicates whether a decode failure has occurred for at least one of the one or more code blocks of the TB.

19. The non-transitory computer-readable memory medium of claim 18, wherein the program instructions are further executable to:
- if the TBS is greater than the first predetermined threshold:
  - bundle the one or more code blocks into the code block groups based on a bundle size indicated in the DCI, wherein the bundle size indicates a number of code blocks per code block group or a number of code block groups per TB.

20. The non-transitory computer-readable memory medium of claim 19, wherein the program instructions are further executable to:
- decode a minimum system information (MSI), a remaining minimum system information (RMSI), a system information block (SIB) or radio resource control (RRC) signaling, wherein the MSI, RMSI, SIB or RRC signaling includes candidate bundle sizes; and
- if the TBS is greater than the first predetermined threshold, select the bundle size from the candidate bundle sizes based on an indicator included in the DCI.

* * * * *